C. C. CLAWSON.
SPEED RECORDER AND ANALOGOUS APPARATUS.
APPLICATION FILED APR. 9, 1907.

1,038,297.

Patented Sept. 10, 1912.

C. C. CLAWSON.
SPEED RECORDER AND ANALOGOUS APPARATUS.
APPLICATION FILED APR. 9, 1907.

1,038,297.

Patented Sept. 10, 1912.

UNITED STATES PATENT OFFICE.

CLEMENT C. CLAWSON, OF FLAGTOWN, NEW JERSEY, ASSIGNOR, BY MESNE ASSIGNMENTS, TO UNITED STATES MORTGAGE & TRUST COMPANY, TRUSTEE, OF NEW YORK, N. Y., A CORPORATION OF NEW YORK.

SPEED-RECORDER AND ANALOGOUS APPARATUS.

1,038,297.          Specification of Letters Patent.     Patented Sept. 10, 1912.

Application filed April 9, 1907. Serial No. 367,217.

*To all whom it may concern:*

Be it known that I, CLEMENT C. CLAWSON, a citizen of the United States, residing at Flagtown, in the county of Somerset and State of New Jersey, have invented new and useful Improvements in Speed-Recorders and Analogous Apparatus, of which the following is a specification.

My invention relates to improvements in recorders, more particularly to recorders for use on vehicles, for example, automobiles, the apparatus automatically noting on a record blank the speed at which the vehicle is traveling, and the speed being noted either directly as such, or indirectly as distance traveled and time occupied in traveling the same, or it may be noted in both modes.

One object of my invention is to provide a recorder which may be readily connected to or disconnected from its actuating mechanism, as may be desired and yet when so connected, cannot be disconnected therefrom, or in any way thrown out of operation, by unauthorized persons, except, of course, by breaking the apparatus.

An apparatus of this kind renders it possible for the owner of an automobile not only to obtain a record of the operations of his car in his presence, but also of any use of his vehicle which may have occurred during his absence and without his consent.

A further object of my invention is to provide an improved recording means whereby a firm and clear record is made without danger of injury to the record blank.

A still further object of the invention is to provide means whereby blurring of the record is avoided.

With these and other objects in view, my invention consists in the features, constructions and combinations of parts which first will be described in connection with the accompanying drawings and then particularly pointed out in the claims.

In the drawings, Fig. 13 a similar view of another modification of the same, and Fig. 14 a detail front elevation showing a modified form of mechanism for transmitting motion from the flexible shaft to the recording mechanism.

The frame of the apparatus consists as shown of a box having ends $a$, back $b$, bottom $c$, cover $d$ and division plate $e$, this last being parallel with the bottom.

Figure 1:
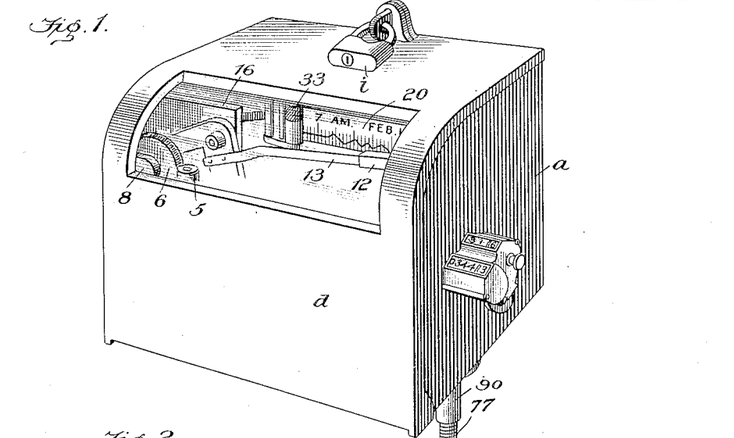
Figure 1 is a perspective view of a speed recorder embodying my invention.
Figure 2:
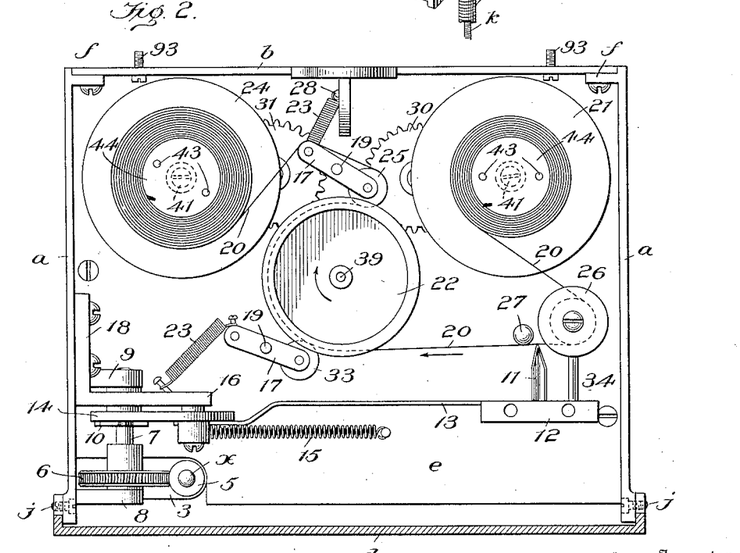
Fig. 2 is a plan view of the same with the cover, except a small portion of the same, removed.

The ends $a$ are provided with upright flanges $f$, to which the back $b$ is fastened, with horizontal flanges $g$, to which the bottom $c$ is fastened, and with horizontal flanges $h$ to which the division plate $e$ is fastened. The bottom, back and ends of the box are fastened together by means which allow detachment, if at all, from the inside only of the box; and the cover $d$ which can be opened from the outside is provided with a lock $i$. As shown, the bottom, back and ends of the box are secured together by screws whose heads are on the inside. The screws $j$ by which the cover $d$ is hinged to the ends of the box also have their heads inside the box, are threaded through the respective ends $a$ of the box, and the projecting ends of said screws form the pintles, on which the cover $d$ is hinged as shown in Fig. 2. The heads of the said screws $j$ are countersunk into the respective ends $a$ and the bottom $c$ covers said screw heads, so that the latter can be removed only by removing the said bottom c. Thus the contents of the box are inaccessible and cannot be tampered with undetected by opening the box otherwise than by unlocking the cover.

In order to prevent the surreptitious running of the automobile or other machine with which the speed recorder may be connected, the flexible shaft k which transmits motion to the speed recorder, is provided with coupling means which can only be uncoupled by a person having a key, thus preventing the detachment of said flexible shaft from either the driving mechanism which rotates the said shaft or from the speed recorder, by unauthorized persons, so long as the parts are locked. The mechanism by which this result is accomplished will be more fully explained hereinafter.

It suffices for the present to say that the flexible shaft k may be coupled to a spindle 45, Fig. 5, which is journaled in the box in a lug 46 on the adjacent flange g and in a lug 47 on the adjacent flange h the end of the said spindle 45 projecting through the bottom c of the box and through a flanged stud or nipple 48, Fig. 12, which will be more fully described hereinafter in connection with the flexible shaft and the coupling means therefor.

The spindle 45 is held against longitudinal movement by means of a collar 49 which is detachably secured by a set screw. The spindle is also provided with a gear wheel 50 which is detachably secured to the spindle 45 by a set screw. This gear-wheel 50 meshes into a gear wheel 51, on a spindle l, which is journaled in lugs p and q formed on the adjacent flanges g and h. The spindle l also carries a worm gear m and a bevel gear n. The said bevel gear n communicates motion to a gear r forming part of a counter s Fig. 3 of known or any suitable construction secured on the adjacent end a of the box outside of the latter.

Figure 3:
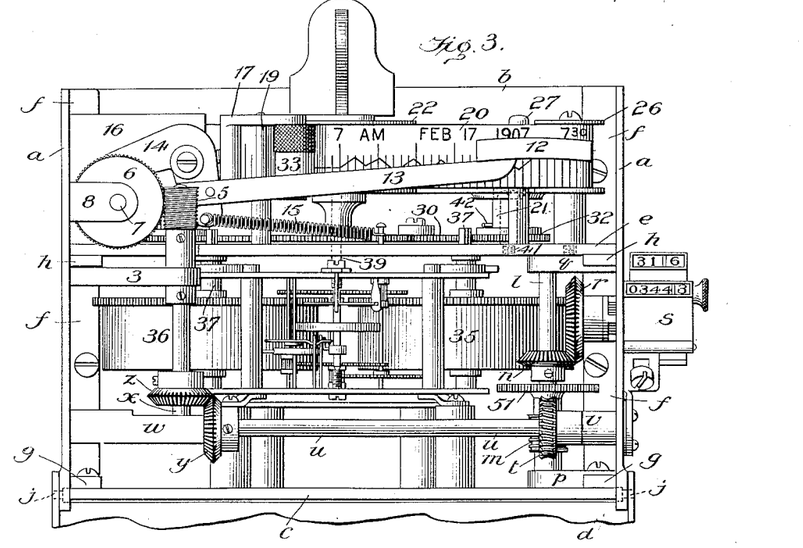
Fig. 3 is a front elevation of the same with the cover turned back and partly broken away.
Figure 5:
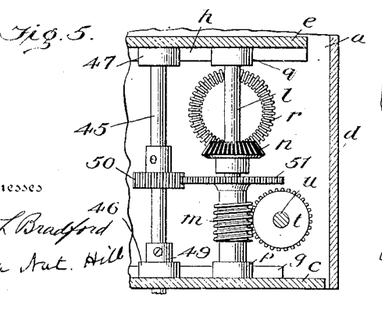
Fig. 5 is a detail view in section and elevation illustrating one form of mechanism for transmitting motion from the driving shaft to the recording mechanism.

As shown in Figs. 3 and 5, the worm gear m communicates motion through an intermeshing gear t, Fig. 3, to a horizontal shaft u which is journaled in lugs v, w on the ends a of the box, and which communicates motion to the upright shaft x through the bevel gears y and z. The shaft x is journaled in legs w and 3 on the adjacent end a of the box. A worm gear 5 on the shaft x communicates motion through an intermeshing gear 6 (Figs. 2 and 3) to a horizontal shaft 7, which is journaled in lugs 8 and 9 on the adjacent ends a of the box, and which near one end, carries a star wheel 10 for imparting a reciprocating movement to a marking instrument 11 of the recorder. As shown, this instrument is in the form of a pen 11, Fig. 2, provided with an ink reservoir 12, and it is mounted on a leaf spring 13, which constitutes the long arm of a lever whose shorter arm 14 is acted upon by the star-wheel, being held yieldingly in contact with said star wheel by a spring 15. The marking instrument is thus actuated by a distance device or in other words, by a device whose movement represents the distance to be recorded.

The pen 11 may be of any known or suitable construction and is shown as consisting of a metal trough beveled in top at its inner end or point. It is supplied with suitable ink from the reservoir 12.

The construction of the pen 11 and its reservoir need not be specifically described herein, as they have been fully described in my currently pending application Serial No. 336,923, filed Oct. 1, 1906, on which Patent No. 850,109 was granted on April 9, 1907.

The lever 13, 14 is fulcrumed on a plate 16 having a flange 18 secured to the adjacent end a of the box.

The marking device is arranged to mark on a tape 20 whereby a record is made. The tape is moved longitudinally and kept in contact with the pen by the tape holding and feeding means, which in the present form consist of a supply spool 21, a feed drum 22, a pair of coacting presser rolls 25 and 33, a receiving reel 24, a guide roller 26 and a guide post 27.

The feed drum 22 is rotated by suitable means, as hereinafter explained. The presser rolls 25 and 33 are each rotatably mounted in a frame 17, each frame being mounted for angular movement upon a vertical post 19, secured to the division plate e. The frames are each pressed yieldingly so that the respective presser rolls 25 and 33 bear upon the feed drum 22, by means of helical tension springs 23, each spring being connected at one end to its respective frame 17, and at its other end to a suitable fixed point. In the present case, the outer end of one spring is secured to the plate 16 and the outer end of the other spring is attached to a vertical post 28, secured to the division plate e.

The presser rolls, 25 and 33, each have one portion of their length of a diameter slightly smaller than that of the other part as shown in Fig. 3 and the peripheries of the larger parts and the entire periphery of the feed drum 22 are advantageously roughened in order to nip the tape more firmly.

In the speed recorder shown in the drawings the feed drum is rotated by a clock work, which in the present example is illustrated as an ordinary clock work supported under and by the division plate e with the arbors of the clock work in a vertical position. This clock work is shown with two springs 35, 36 mounted on two winding arbors 37.

Figure 4:
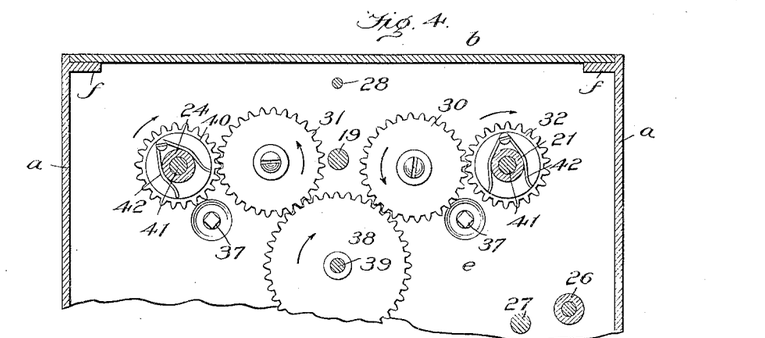
Fig. 4 a partial sectional view taken in a horizontal plane a short distance above the division plate.

The minute arbor 39 of the clock work is extended through the division plate e and carries a gear wheel 38, Fig. 4, and also the feed drum 22. By having the presser rolls 25 and 33 at diametrically opposite points on the periphery of the drum 22, the arbor on which the latter is mounted is relieved of lateral stress from the pressure of said rolls and friction is reduced. The gear wheel 38 tends to revolve the supply spool 21 and does revolve the reel 24 through the intermediary of idler wheels 30, 31, the former intermeshing with a gear-wheel 32 on the same arbor as the supply spool 21 and the latter intermeshing with a gear-wheel 40 on the same arbor as the reel 24, the gear wheel 32 and the gear wheel 40 each having a friction connection with the said supply spool and reel respectively.

The arbors 41 for the supply spool and reel are formed by shouldered screws tapped into the division plate e, as indicated in Fig. 3.

In order to form the friction connection above referred to, the gear-wheels 32 and 40 each carry a forked spring 42 (Fig. 4) which embraces the hub of the respective reel and turns or tends to turn it by friction.

The feeding of the tape is effected by the feed drum 22 in conjunction with the spring pressed presser rolls 25, 33 the reel 24 merely winds up the tape as fast as it is fed to it by said drum, while the supply spool 21 tends to rotate in a backward direction so as to insure that the tape is kept taut.

The gearing is so proportioned that it tends to revolve the reel 24 at a greater peripheral speed than that of the feed drum 22 so as to keep the tape between said drum and the reel 24 under the slight tension afforded by the friction of the spring 42.

The tape passes from the supply spool 21 around the guide roller 26, over the guide post 27, thence half way around the feed drum 22, against which it is firmly pressed by the larger diameters of the presser rolls 33 and 25; from the feed drum it passes around the outer end of the frame 17 of said presser roll 25 to the reel 24.

The reduced portions of the presser rolls 25 and 33 are arranged to come opposite that part of the tape on which the record is made by the marking device, whereby all pressure on this record is avoided and thus blurring of the freshly marked surface of the record tape is prevented. Futhermore, the end of the frame which carries the presser roll 25 may also be cut away slightly opposite the marked portion of the tape in order that it also may not exert a pressure on and blur the record.

The marking device, in this case the pen 11, bears on the tape at a point where the tape is unsupported, in the present embodiment between the guide post 27 and the guide roller 26.

The roller 26 and drum 22 are separated from each other and the pen arranged near the roller 26 in order to expose a considerable distance of marked record between them; but it is not considered advantageous to allow so great liberty to the tape as would result from leaving it unsupported between the roller 26 and the drum 22. The post 27 intermediate the pen 11 and the drum 22 is, therefore, arranged to support the tape at a suitable distance from the roller 26. The advantage of leaving the tape 20 unsupported at the place where it is in contact with the pen 11 arises from the fact, first discovered, as I believe, by myself, that, when there is the usual unyielding backing behind the tape opposite the pen, the rubbing of the latter on the tape is liable (at least at times) to wear the surface of the paper in such manner that the ink can penetrate into or through the body of the tape, with the undesirable result of spreading the ink. In the improvement forming part of the present invention the blank is yieldingly supported at the bearing of the pen thereon; and there is an appropriate uniformity of pressure of the pen against the tape to induce the ink to pass from the pen to the paper so as to make an ink line thereon.

In order to limit the movement of the marking device, a suitable means for this purpose is provided, as for example, by providing the marking device with a pin 34, secured to the ink reservoir 12, and arranged to bear against the tape where it passes over the guide roller 26. The pen 11 is of such length that it will make a firm impression upon the tape yet cannot cut or tear said tape because of the stop pin 34, contacting with the tape and guide roller. By thus causing the marking device to contact with the tape opposite an unsupported portion of the latter while at the same time limiting the movement of the marking device toward the tape, a clear and satisfactory mark is made by the pen upon the tape without undue pressure and therefore without danger of injury to the tape, a result not hitherto attained in recorders when the pen presses upon the tape at a point where the latter is supported by a platen of any kind.

The supply spool 21 and the reel 24 are each provided with two vertical pins 43 upon which may be slipped a temporary bobbin 44, these bobbins having openings to receive the pins. Each bobbin is also provided with a slit which receives and holds one end of the tape. The bobbins may be of wood or other cheap material.

In equipping the recorder with tape, an empty bobbin is placed on the reel 24 and a full bobbin on the supply spool 21. The tape is then drawn from the supply spool, passed around the guide roll, over the guide post and around the feed drum, and secured to the empty bobbin on the reel 24 by inserting its end in the slit in the empty bobbin and winding up a short portion of the tape.

By pressing the two frames 17 at their ends remote from the presser-rolls which can be made with the thumb and finger of one hand the rolls can be swung simultaneously away from the feed drum and thus the tape may be placed around the drum conveniently, the springs 23 returning the frames to place as soon as the pressure is removed.

The means for connecting the flexible shaft to the speed recorder and for driving said shaft will now be described in that embodiment of the invention which is particularly adapted for use in automobiles.

Figure 7:
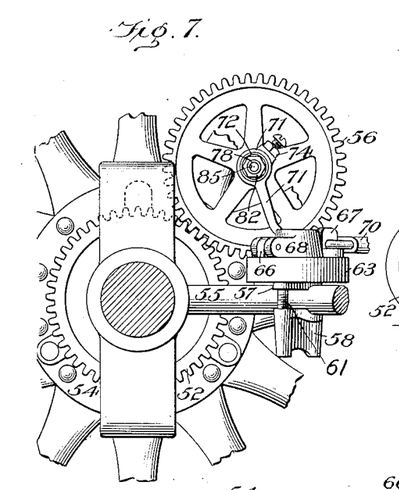
Fig. 7 a detail side elevation partly in section of the mechanism for driving the flexible shaft from the wheel of a vehicle.
Figure 8:
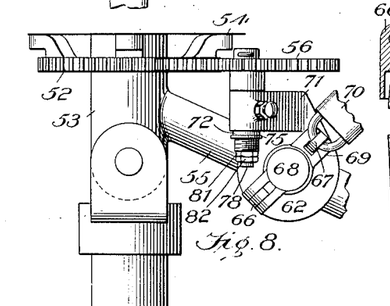
Fig. 8 a detail plan view of the same.
Figure 9:
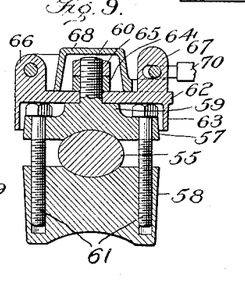
Fig. 9 a detail vertical sectional view of the device for securing the gear standard or bracket to a vehicle.

To the rotating part from which power is to be taken as for example, the wheel of the automobile, is secured a gear wheel 52, Figs. 7 and 8. In the present example, this gear wheel is shown with an open center through which the axle 53 of the automobile wheel may pass. The gear wheel 52 is secured to the hub of the vehicle wheel by a plurality of lugs, in the present case three, which are held to the wheel 54 by rivets with heads countersunk so as to be non-detachable.

To a suitable part of the vehicle, as for example, to the crank arm 55, which serves to operate the axle 53 in steering the wheel, is secured a bracket which carries a gear wheel 56 which meshes with the gear wheel 52. This bracket is provided with means whereby it may be attached to or detached from the part to which it is secured, while at the same time, not being capable of removal by unauthorized persons, except, of course, by breaking it off. In the present embodiment of the invention this result is accomplished as follows: A clamp comprising an upper and a lower clamp block is provided, these clamp blocks being indicated at 57 and 58 respectively. The upper block 57 has a central boss 59 raised above the level of its two ends and a threaded stud 60 extending upward from said boss. Through the ends of the upper block pass two screws 61 whose ends are threaded into the lower clamp block, these screws serving to draw the clamp blocks together and thus securely clamp the particular member of the machine or vehicle to which they are secured. The upper faces of the heads of the screws do not extend above the surface of the central boss. To prevent tampering with the said screws, a cap plate 62 is provided which has a central opening through which the stud 60 of the upper clamp block passes, and a depending flange 63 at its outer edges, which encircles the screw heads and prevents access to them laterally.

The stud 60 is provided with a nut 64, and a lock nut 65 whereby the cap-plate is held firmly to the upper clamp block. The cap plate is provided on its upper surface with two posts or lugs 66, 67 to one 66 of which is hinged a cover 68, arranged to swing down onto the cap-plate and cover the nuts 64 and 65. The cover 68 is provided at its free end with a fork 69 which is arranged to straddle the post 67. The latter is provided with an eye through which may be inserted the hasp of a padlock 70, whereby the cover is locked in place.

Figure 11:
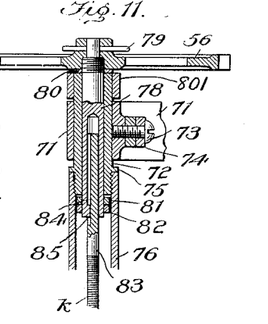
Fig. 11 a detail sectional view of the gear bracket or standard showing the adjustable spindle bearing and the means for detachably connecting the flexible shaft to the gear for driving it.

The cap-plate 62, carries the bracket arm 71 which is provided at its free end with an opening in which is inserted an adjustable journal bearing in this case consisting of a sleeve 72, longer than the width of the end of the bracket-arm and capable of adjustment longitudinally in the opening in said arm 71, being fixed in any position to which it may be adjusted, by means of a set screw 73, which may be provided with lock-nuts 74 as shown in Figs. 7 and 11.

The sleeve is provided at its end next to the flexible shaft, with a flange 75 beyond which the sleeve end is threaded to receive an interiorly threaded thimble 76 rigidly and permanently secured to one end of the sheath 77 of the flexible shaft $k$, in any suitable manner, as, by brazing, this sheath consisting of a coiled strip of metal.

The sleeve 72 serves as a bearing for a spindle 78, which projects beyond the sleeve 72 at both ends, the outer end being permanently secured to the gear-wheel 56 in any suitable manner, as for example, by threading the said gear-wheel onto the outer end of the spindle 78, a pin 79 being then passed through the hub of the gear-wheel and through the spindle. Between the end of the sleeve 72 and the gear-wheel 56 a washer 80 may be inserted.

At 801 is a loose collar on the projecting end of the sleeve 72 designed to prevent the latter being turned by a tool in order to unscrew it from the thimble 76; for, if undetected surreptitious use of the automobile is to be prevented, the shaft $k$ between the recording appliances on the one hand and the wheel 54 on the other must be devoid of detachable connection unprotected by lock. It will be impossible to screw the gear wheel 56 off from the spindle 78; because there is no part of spindle 78 so exposed that it can be held from turning.

The projecting inner end of the spindle 78 is threaded exteriorly and provided with a nut and a lock nut, indicated at 81 and 82, Fig. 11, whereby the spindle is held against withdrawal outward. The inner portion of the spindle 78 is arranged to be coupled to a spindle 83 carried by the flexible shaft $k$.

In the preferred embodiment of my invention, the connection between the spindle 78 and the spindle 83 is made in the following manner: The inner portion of the spindle 78 is tubular and arranged to receive the end of the spindle 83, which is grooved longitudinally as indicated at 84, this groove being engaged by a projection or feather 85 carried by the spindle 78, as will be clear from Fig. 11.

The flexible shaft $k$ and its flexible sheath 77 may be constructed, in the usual known way, of an inner and an outer helical coil of metal, as will be fully understood by those skilled in the art.

Figure 10:
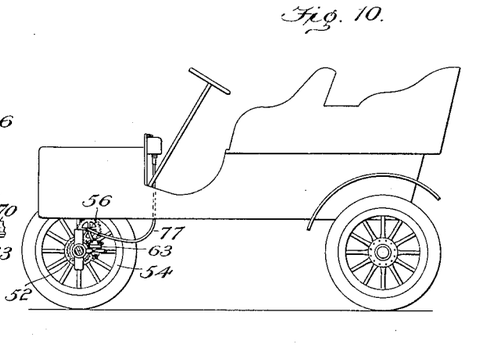
Fig. 10 a side elevation of an automobile equipped with an apparatus embodying my invention.
Figure 12:
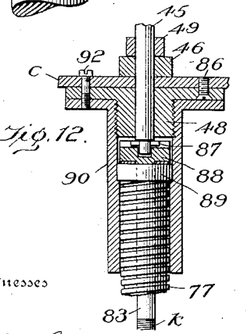
Fig. 12 a detail sectional view of one means for connecting the flexible shaft to the speed recorder.

The connection between the flexible shaft and the speed recorder as shown in Fig. 12 is made as follows: To the bottom of the speed recorder is secured a flanged thimble 48 by means of screws 86, the spindle 45, which is to be driven by the flexible shaft, projecting through said thimble 48. This projecting end is reduced in diameter and provided with a transverse pin 87, as shown. The flexible shaft $k$ has its end provided with a head 88, which is bored to receive the reduced end of the spindle 45, and has a transverse slot to receive the pin 87. The sheath of the flexible shaft is provided with a collar 89. Over this collar is placed a flanged sleeve 90 whose interior diameter outside the collar 89 is substantially equal to the exterior diameter of the sheath 77 of the flexible shaft, whereas the interior diameter of said sleeve 90 at the part which receives the collar 89 and from there inward toward the speed recorder is slightly larger than the exterior diameter of the collar 89, and is arranged to fit over the flanged thimble 48. The sleeve 90 is rigidly and permanently fastened on the end of the sheath 77 so that it is impossible to turn the latter in said sleeve with a view to unscrewing the thimble 76 from the sleeve 72, said thimble 76 as hereinbefore mentioned being rigidly and permanently secured to the corresponding end of the sheath 77. In coupling up, the sleeve 90 would first be screwed on to the thimble 48 and then fastened by screw 92 inserted from the inside of the box; then (the gear 56 and its supporting parts being detached from the arm 55) the sleeve 72 would be screwed into the thimble 76; the gear 56 and its supporting parts would be replaced on the arm 55; the cover 68 would be secured by lock 70; and the cover $d$ of the recorder would be secured by lock $i$. Before coupling up, the box of the recorder would be secured to a suitable part of the vehicle (the dash board as shown in Fig. 10) by fastenings (as screws 93, Fig. 2) accessible only from inside the recorder box. After coupling up, it is impossible to uncouple the wheel 54 of the automobile from the star wheel 10 which moves the marking instrument 11 without breaking some part or else by opening one or other of the locks $i$ and 70.

Figure 13:
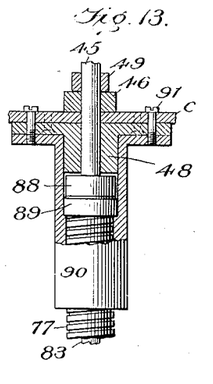

As shown in Fig. 13, the sleeve 90 is simply slipped over the outer end of the thimble 48 and is secured in place by screws 91 from inside the box. With this arrangement, the sheath 77 of the flexible shaft can be secured to the recorder equally well before or after it is secured to spindle 72.

Figure 6:
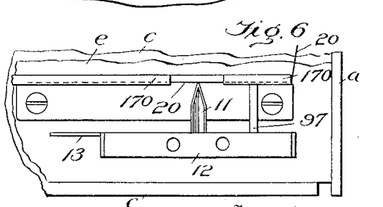
Fig. 6 is a detail plan view of a modified form of tape supporting and marking mechanism embodying my invention.
Figure 14:
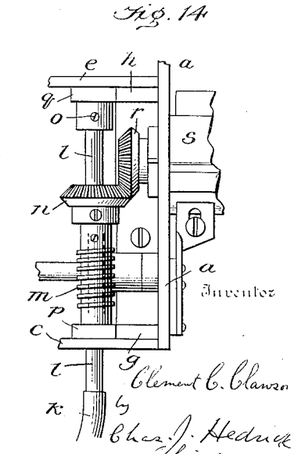

In Fig. 14, the spindle $l$ is permanently secured to the end of the flexible shaft $k$ and is slipped up through lugs $p$ $q$, gears $m$, $n$, and collar $o$ and is secured by set screws. To uncouple the recorder from the flexible shaft, these screws are taken out and the spindle $l$ withdrawn endwise. The set screws are not accessible except when the recorder box is open. This arrangement is also shown in my hereinabove mentioned concurrently pending application of October 1, 1906, No. 336,923, which originally also set forth other matter included with such an arrangement in the present invention and of which the present application is as to all so included matter a continuation. In said application of October 1, 1906, the tape 20 is supported in front of an upright plate 17 which acts as a platen. In Fig. 6, such upright plate 17 is (in accordance with the present invention) cut away opposite the pen 11 so as to leave the tape unsupported at this place and the reservoir 12 is provided with a stop 97 to limit the motion of the pen toward the tape. In my said application of October 1, 1906, I have shown and described a number of varieties of recording apparatus, in one of which varieties the pen is moved by a distance device; in another of which it is moved by a clock-work; and in a third of which it is moved by a direct speed (centrifugal) device. I have indicated therein the wide field in which one or more parts at least of the invention of said application could be employed. In the present application, only that variety of recorder is shown in which the pen is moved by a distance device, but the improvements constituting the present invention can be applied to each of the other varieties shown in my said application of October 1, 1906, by making corresponding changes in the recorder shown herein. And as to some at least of the present improvements, the wide field of employment also exists which is indicated in my said application of October 1, 1906.

Having thus fully described my invention, what I claim as new and desire to secure by Letters Patent of the United States, is:

1. A recorder which consists of blank supporting means, a marking instrument, means for supporting this latter, and means for causing the relative positions of the record blank and the marking instrument to be shifted in order that fresh surfaces of the blank may be presented to the marking instrument, the recorder including a box which incloses the recording appliances and an exterior flexible shaft, which conveys motion to said appliances from the exterior driving mechanism, the said box having a lock and being constructed to prevent access to its interior by taking apart when locked, and the said flexible shaft being detachably connected with said appliances and said mechanism by devices under lock and being devoid of connections formed by detachable devices not under lock whose disengagement would allow the disconnection from each other of said appliances and said mechanism so that the arrangement as a whole serves to prevent surreptitious running of said mechanism, substantially as described.

2. A recorder which consists of blank supporting means, a marking instrument, means for supporting this latter, and means for causing the relative positions of the record blank and the marking instrument to be shifted in order that fresh surfaces of the blank may be presented to the marking instrument, the recorder including a locked box which incloses the recording appliances and an exterior flexible shaft which is detachably connected at opposite ends with said appliances and the exterior driving mechanism whose movements are to be recorded the shaft connections at each end being under lock, substantially as described.

3. A recorder which consists of blank supporting means, a marking instrument, means for supporting this latter, and means for causing the relative positions of the record blank and the marking instrument to be shifted in order that fresh surfaces of the blank may be presented to the marking instrument, and which includes a locked box inclosing the recording appliances, means for transmitting motion from the exterior driving mechanism to said appliances, and detachable devices under lock for connecting with each other said appliances and said mechanism, all the detachable devices whose disengagement would allow the disconnection from each other of said appliances and said mechanism being under lock so as to prevent surreptitious running of said mechanism, substantially as described.

4. A recorder which consists of blank supporting means, a marking instrument, means for supporting this latter, and means for causing the relative positions of the record blank and the marking instrument to be shifted in order that fresh surfaces of the blank may be presented to the marking instrument, the said marking instrument being in the form of a pen supplied with liquid ink, and the said blank supporting means furnishing an open space behind the blank at the place where the pen bears against the face of the blank and holding the latter against the point of the pen with uniformity of pressure suited to induce the flow of the ink from the pen onto the record blank so as to make an ink line thereon, substantially as described.

5. A recorder which consists of blank supporting means, a marking instrument, means for supporting this latter, and means for causing the relative positions of the record blank and the marking instrument to be shifted in order that fresh surfaces of the blank may be presented to the marking instrument, the said marking instrument being in the form of a pen supplied with liquid ink, and the said blank supporting means being arranged to support a blank in the form of a tape and to stretch the same across an open space located behind the blank at the place where the pen bears against the face of the blank and to hold the latter against the point of the pen with uniform pressure suited to induce the flow of the ink from the pen on to the record blank so as to make an ink line thereon, substantially as described.

6. A recorder which consists of blank supporting means, a marking instrument, means for supporting this latter, and means for causing the relative positions of the record blank and the marking instrument to be shifted in order that fresh surfaces of the blank may be presented to the marking instrument, the said blank supporting means including a rotary horizontal table provided with a hub on its under side and arranged to receive on its upper side a temporary bobbin for a record blank in the form of a tape, which bobbin rests by gravity on said table, and also including a friction device engaging said hub, and said table having provisions on its said upper side for enabling the bobbin to be slipped into and out of engagement with said table, substantially as described.

7. The combination with a marking instrument, and means for supporting it, of tape supporting and feeding means which include a feed drum and spring pressed rolls located all of them on the same side of said instrument and arranged for said rolls to clamp the tape against diametrically opposite sides of said drum, said rolls being carried by pivoted frames tangentially disposed in order that their pressure may be in the line of the drum's diameter, substantially as described.

8. The combination with a marking instrument, and means for supporting it, of tape supporting and feeding means which include a feed drum and spring pressed rolls located all of them on the same side of said instrument and arranged for said rolls to clamp the tape against diametrically opposite sides of said drum, said rolls being carried by pivoted frames tangentially disposed in order that their pressure may be in the line of the drum's diameter and having extensions beyond the respective pivots in order that the rolls may be simultaneously withdrawn from said drum by pressing said extensions toward each other, substantially as described.

9. A recorder which consists of means for supporting and shifting a blank, a marking instrument in the form of a pen supplied with liquid ink, and means for supporting said instrument and for traversing it across the face of the blank, said blank supporting means holding the blank yieldingly at the bearing of said pen, and a stop being provided adjacent to said pen to limit the latter's pressure on the blank, substantially as described.

10. A recorder which consists of a blank supporting means, a marking instrument, means for supporting this latter, and means for causing the relative positions of the record blank and the marking instrument to be shifted, in order that fresh surfaces of the blank may be presented to the marking instrument, said blank supporting means being arranged to leave the record blank unsupported at the point of bearing of the marking instrument and comprising a guide roller against which the record blank bears, the means for supporting the marking instrument comprising a stop-device arranged to contact with the record blank over the guide roller whereby the pressure of the marking instrument on the record blank is limited, substantially as described.

11. A recorder which consists of means for supporting and shifting a record blank in the form of a tape, a marking instrument, and means for supporting the latter, said blank supporting and blank shifting means including feed devices gripping the tape, a supply spool, a receiving reel, a friction transmission for said spool tending to rotate it in the direction to prevent unwinding the tape therefrom, and a friction transmission rotating said reel in the direction to wind the marked tape thereon and tending to rotate it more rapidly than would suffice to take care of the slack furnished by said feed devices, substantially as described.

12. A recorder which consists of means for supporting and shifting a record blank in the form of a tape, a marking instrument, and means for supporting the latter, said blank supporting and blank shifting means including feed devices gripping the tape, a supply spool, and a friction transmission for said spool tending to rotate it in the direction to prevent unwinding of the tape therefrom, substantially as described.

13. The combination with a tape-supply spool arranged to resist withdrawal of the tape with yielding force, and means for gripping the tape and feeding it, of two intermediate guides with a space between them across which the tape is led, a marking instrument supplied with liquid ink and arranged to bear on the tape at such intermediate space, and a stop to limit the pressure of said instrument on said tape, substantially as described.

14. A recorder which consists of a supply spool for a record tape, two tape guides in front of said spool, a feed drum with presser rolls for leading the tape circuitously after marking and for clamping unmarked portions only of the tape, a reel receiving the tape from said drum, a marking instrument in the form of a pen supplied with ink movable transversely across the face of the tape and arranged to bear upon the unsupported tape between said tape guides, and a stop to limit the pressure of the pen against the tape, substantially as described.

15. A recorder which consists of blank supporting means, a marking instrument, means for supporting the latter, and means for causing the relative positions of the record blank and the marking instrument to be shifted in order that fresh surfaces of the blank may be presented to the marking instrument, and which includes a locked box constructed to prevent access to its interior when locked and inclosing the recording appliances and being secured detachably to its support by devices accessible only from within the box, a flexible shaft for transmitting motion from the exterior driving mechanism to the recording appliances, and detachable devices under lock for connecting the corresponding ends of said shaft with said appliances and said mechanism, respectively, all the detachable devices whose disengagement would allow the disconnection from each other of said appliances and said mechanism being under lock so as to prevent surreptitious running of said mechanism, substantially as described.

16. A recorder which consists of blank supporting means, a marking instrument, means for supporting the latter, and means for causing the relative positions of the record blank and the marking instrument to be shifted in order that fresh surfaces of the blank may be presented to the marking instrument, and which includes a flexible shaft for transmitting motion from the exterior driving mechanism to the recording appliances, a bracket carrying a gear wheel connected with one end of said shaft for engaging the latter with the driving mechanism, a clamp for securing said bracket detachably in position to secure such engagement, and a locked cover for said clamp, substantially as described.

17. A recorder which consists of blank supporting means, a marking instrument, means for supporting the latter, and means for causing the relative positions of the record blank and the marking instrument to be shifted in order that fresh surfaces of the blank may be presented to the marking instrument, and which includes a flexible shaft transmitting motion from the exterior driving mechanism to the recording appliances and having a flexible sheath with a screw coupling at one end at least of the same, and means whereby the parts connected by said sheath are detachably secured by devices under lock to supports which prevent the turning of the so connected and so secured parts in order thereby to unscrew said coupling, substantially as described.

18. A recorder which consists of means for supporting a record blank of paper, a marking instrument in the form of a pen supplied with liquid ink and liable to wear away the surface of the paper blank by its movement in contact therewith were said blank to be held by a solid backing at the bearing of said pen, means for supporting said instrument, means for feeding the record blank, means for traversing the marking instrument across the face of the record blank, and means connected with said blank supporting means for holding the blank at the bearing of said pen thereon with uniform yielding pressure adjusted to induce the flow of ink from the pen onto the record blank without wearing away the surface of the record blank, so that a solid line is made and remains on the face of the paper without penetrating to its farther surface, substantially as described.

In testimony whereof I affix my signature, in presence of two subscribing witnesses.

CLEMENT C. CLAWSON.

Witnesses:
W. K. SMITH,
H. H. SMITH.